US006725259B1

(12) United States Patent
Bharat

(10) Patent No.: US 6,725,259 B1
(45) Date of Patent: *Apr. 20, 2004

(54) RANKING SEARCH RESULTS BY RERANKING THE RESULTS BASED ON LOCAL INTER-CONNECTIVITY

(75) Inventor: Krishna Bharat, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/351,316

(22) Filed: Jan. 27, 2003

Related U.S. Application Data

(63) Continuation of application No. 09/771,677, filed on Jan. 30, 2001, now Pat. No. 6,526,440.

(51) Int. Cl.[7] .............................................. G06F 13/00
(52) U.S. Cl. ................................ 709/219; 707/3; 707/7
(58) Field of Search ................................ 709/217, 219, 709/223, 224, 313; 707/3, 6, 7, 10

(56) References Cited

U.S. PATENT DOCUMENTS

| | | | | |
|---|---|---|---|---|
| 5,870,740 A | * | 2/1999 | Rose et al. ..................... | 707/5 |
| 5,907,840 A | * | 5/1999 | Evans ............................ | 707/5 |
| 5,913,208 A | | 6/1999 | Brown et al. .................. | 707/3 |
| 5,920,859 A | * | 7/1999 | Li .................................. | 707/5 |
| 6,070,158 A | | 5/2000 | Kirsch et al. .................. | 707/3 |
| 6,119,114 A | * | 9/2000 | Smadja .......................... | 707/7 |
| 6,263,329 B1 | | 7/2001 | Evans ............................ | 707/3 |
| 6,286,000 B1 | | 9/2001 | Apte et al. .................... | 707/5 |
| 6,546,388 B1 | * | 4/2003 | Edlund et al. ................. | 707/5 |

OTHER PUBLICATIONS

"Automatic Resource Compilation by Analyzing Hyperlink Structure and Associated Text"; Soumen Chakrabarti et al.; 1998; pp. 1–14.
"The Anatomy of a large–Scale Hypertextual Web Search Engine"; Sergey Brin et al.; print date Aug. 7, 2000; pp. 1–20.
"Hilltop: A Search Engine Based on Expert Documents"; Krishna Bharat; Feb. 2000; pp. 1–12.
"Does "Authority" Mean Quality" Predicting Expert Quality Ratings of Web Documents; Brian Amento et al.; Jul. 2000; pp. 296–303.

* cited by examiner

*Primary Examiner*—Viet D. Vu
(74) *Attorney, Agent, or Firm*—Harrity & Snyder, LLP

(57) ABSTRACT

A search engine for searching a corpus improves the relevancy of the results by refining a standard relevancy score based on the interconnectivity of the initially returned set of documents. The search engine obtains an initial set of relevant documents by matching a user's search terms to an index of a corpus. A re-ranking component in the search engine then refines the initially returned document rankings so that documents that are frequently cited in the initial set of relevant documents are preferred over documents that are less frequently cited within the initial set.

30 Claims, 3 Drawing Sheets

RANKING SEARCH RESULTS BY RERANKING THE RESULTS BASED ON LOCAL INTER-CONNECTIVITY

This application is a continuation, of application Ser. No. 09/771,677, filed Jan. 30, 2001, now U.S. Pat. No. 6,526,440.

BACKGROUND OF THE INVENTION

A. Field of the Invention

The present invention relates generally to the ranking of search results and, more particularly, to search engines that intelligently rank web pages based on a search query.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. Determining appropriate scores can be a difficult task. For one thing, the importance of a web page to the user is inherently subjective and depends on the user's interests, knowledge, and attitudes. There is, however, much that can be determined objectively about the relative importance of a web page. Conventional methods of determining relevance are based on the contents of the web page. More advanced techniques determine the importance of a web page based on more than the content of the web page. For example, one known method, described in the article entitled "The Anatomy of a Large-Scale Hypertextual Search Engine," by Sergey Brin and Lawrence Page, assigns a degree of importance to a web page based on the link structure of the web page. In other words, the Brin and Page algorithm attempts to quantify the importance of a web page based on more than just the content of the web page.

The overriding goal of a search engine is to return the most desirable set of links for any particular search query. Thus, it is desirable to improve the ranking algorithm used by search engines and to therefore provide users with better search results.

SUMMARY OF THE INVENTION

Systems and methods consistent with the present invention address this and other needs by providing an improved search engine that refines a document's relevance score based on inter-connectivity of the document within a set of relevant documents.

In one aspect, the present invention is directed to a method of identifying documents relevant to a search query. The method includes generating an initial set of relevant documents from a corpus based on a matching of terms in a search query to the corpus. Further, the method ranks the generated set of documents to obtain a relevance score for each document and calculates a local score value for the documents in the generated set, the local score value quantifying an amount that the documents are referenced by other documents in the generated set of documents. Finally, the method refines the relevance scores for the documents in the generated set based on the local score values.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

As described herein, a search engine modifies the relevance rankings for a set of documents based on the inter-connectivity of the documents in the set. A document with a high inter-connectivity with other documents in the initial set of relevant documents indicates that the document has "support" in the set, and the document's new ranking will increase. In this manner, the search engine re-ranks the initial set of ranked documents to thereby refine the initial rankings.

Figure 1:
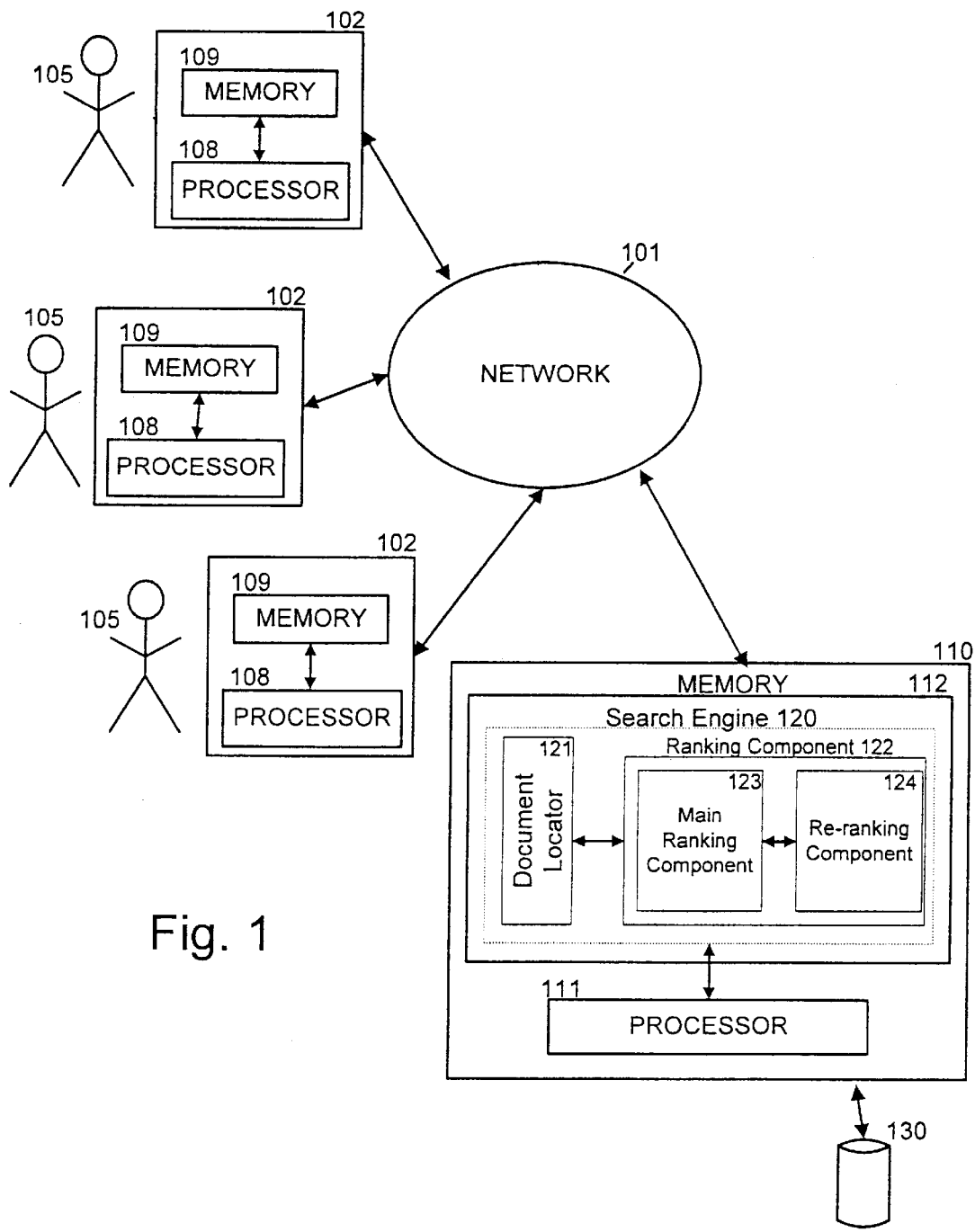
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may be, for example, the Internet. Client devices 102 each include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer readable memory 112. Server device 110 may additionally include a secondary storage element, such as database 130.

Client processors 108 and server processor 111 can be any of a number of well known computer processors, such as processors from Intel Corporation, of Santa Clara, Calif. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 contains a search engine program 120. Search engine program 120 locates relevant information in response to search queries from users 105. In particular, users 105 send search queries to server device 110, which responds by returning a list of relevant information to the user 105. Typically, users 105 ask server device 110 to locate web pages relating to a particular topic and stored at other devices or systems connected to network 101. Search engine 120 includes document locator 121 and a ranking component 122. In general, document locator 121 finds a set of documents whose contents match a user search query. Ranking component 122 further ranks the located set of documents based on relevance. A more detailed description of the functionality implemented by search engine 120, document locator 121, and ranking component 122 will be described below.

Document locator 121 may initially locate documents from a document corpus stored in database 130 by comparing the terms in the user's search query to the documents in the corpus. In general, processes for indexing web documents and searching the indexed corpus of web documents to return a set of documents containing the searched terms are well known in the art. Accordingly, this functionality of relevant document component 121 will not be described further herein.

Ranking component 122 assists search engine 120 in returning relevant documents to the user by ranking the set of documents identified by document locator 121. This ranking may take the form of assigning a numerical value corresponding to the calculated relevance of each document identified by document locator 121. Ranking component 122 includes main ranking component 123 and re-ranking component 124. Main ranking component 123 assigns an initial rank to each document received from document locator 121. The initial rank value corresponds to a calculated relevance of the document. There are a number of suitable ranking algorithms known in the art. One of which is described in the article by Brin and Page, as mentioned in the Background of the Invention section of this disclosure. Alternatively, the functions of main ranking component 123 and document locator 121 may be combined so that document locator 121 produces a set of relevant documents each having rank values. In this situation, the rank values may be generated based on the relative position of the user's search terms in the returned documents. For example, documents may have their rank value based on the proximity of the search terms in the document (documents with the search terms close together are given higher rank values) or on the number of occurrences of the search term (e.g., a document that repeatedly uses a search term is given a higher rank value).

Figure 2:
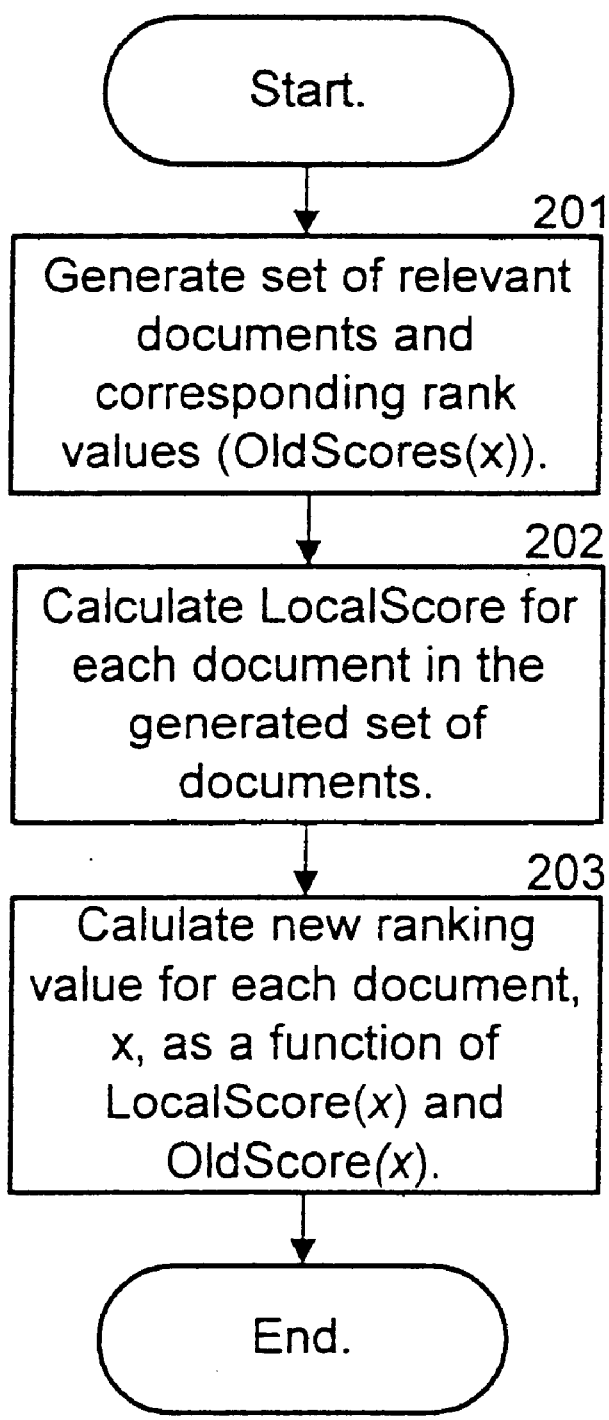
FIG. 2 is a flow chart illustrating methods consistent with the present invention for ranking documents within a search engine.

FIG. 2 is a flow chart illustrating methods consistent with the present invention for implementing ranking component 122.

In response to a search query, document locator 121 and main ranking component 123 generate an initial set of relevant documents, including ranking values associated with each of the documents in the set. (Act 201). This initial set of documents may optionally be limited to a preset number N (e.g., N=1000) of the most highly ranked documents returned by main ranking component 123. The initial rankings, for each document, x, in the returned set of relevant documents, is referred to herein as OldScores(x). For each document in the set, re-ranking component 124 calculates a second value, referred to as LocalScore(x). (Act 202). The LocalScore for each document x is based on the relative support for that document from other documents in the initial set (the computation of LocalScore is described in more detail below with reference to FIG. 3). Documents linked to by a large number of other documents in the initial set (i.e., documents with high relative support), will have a high LocalScore. Finally, search engine 120 computes the final, new ranking value for each document, called NewScore(x), as a function of the document's LocalScore value and its OldScore value. (Act 203).

Figure 3:
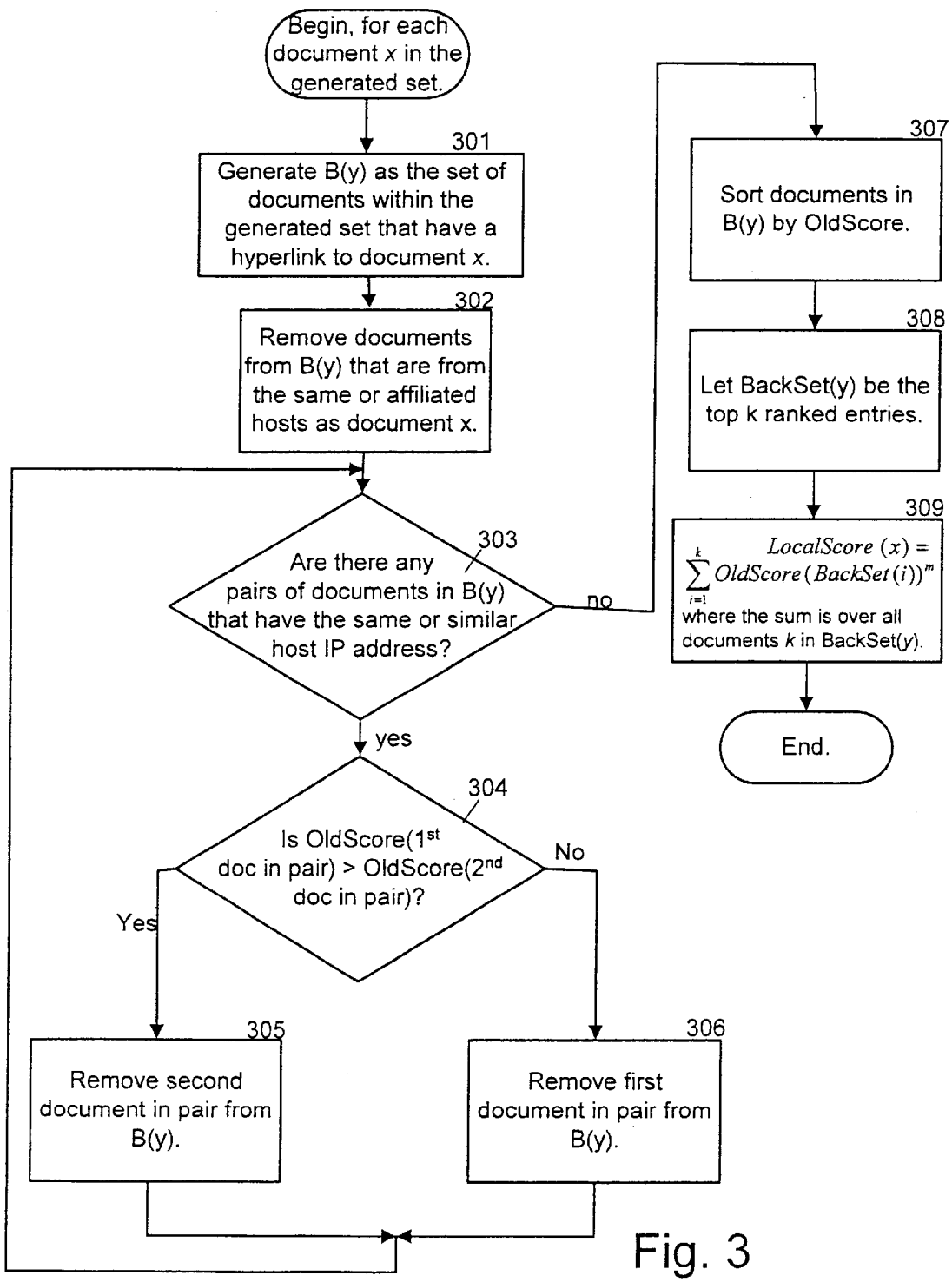
FIG. 3 is a flow chart illustrating, in additional detail, methods consistent with the present invention for ranking documents within a search engine.

FIG. 3 is a flow chart illustrating the calculation of the LocalScore value, by re-ranking component 124, for each document x in the initial set of documents.

Re-ranking component 122 begins by identifying the documents in the initial set that have a hyperlink to document x. (Act 301). The set of documents that have such hyperlinks are denoted as B(y). Documents from the same host as document x tend to be similar to document x but often do not provide significant new information to the user. Accordingly, re-ranking component 124 removes documents from B(y) that have the same host as document x. (Act 302). More specifically, let IP3(x) denote the first three octets of the IP (Internet Protocol) address of document x (i.e., the IP subnet). If IP3(x)=IP3(y), document y is removed from B(y).

On occasion, multiple different hosts may be similar enough to one another to be considered the same host for purposes of Acts 301 and 302. For example, one host may be a "mirror" site for a different primary host and thus contain the same documents as the primary host. Additionally, a host site may be affiliated with another site, and thus contain the same or nearly the same documents. Similar or affiliated hosts may be determined through a manual search or by an automated web search that compares the contents at different hosts. Documents from such similar or affiliated hosts may be removed by re-ranking component 124 from B(y) in Act 302.

Re-ranking component 124 next compares all pairs of documents in B(y) for any pair in which IP3(first document of the pair)=IP3(second document of the pair), and removes the document of the pair from B(y) that has the lower OldScore value. (Acts 303–306). In other words, if there are multiple documents in B(y) for the same (or similar or affiliated) host IP address, only the document most relevant to the user's search query, as determined by the document's OldScore, is kept in B(y). Documents are removed from B(y) in this manner to prevent any single author of web content from having too much of an impact on the ranking value.

After removing documents from B(y) in Acts 303–306, re-ranking component 124 sorts the documents in B(y) based on OldScore(y). (Act 307). Let BackSet(y) be the top k entries in the sorted version of B(y), (Act 308), where k is set to a predetermined number (e.g., 20). Re-ranking component 124 then computes LocalScore(x) as:

$$LocalScore(x) = \sum_{i=1}^{k} OldScore(BackSet(i))^m,$$

where the sum is over the k documents in BackSet and m is a predetermined value that controls the sensitivity of LocalScore to the documents, in BackSet. (Act 309). The appropriate value at which m should be set varies based on the nature of the OldScore values, and can be determined by trial and error type testing. Typical values for m are, for example, one through three.

As previously mentioned, the final re-ranking value, NewScore, is computed for each document x by search engine 120 as a function of LocalScore(x) and OldScore(x). More particularly, NewScore(x) may be defined as $$\text{NewScore}(x)=(a+\text{LocalScore}(x)/\text{MaxLS})(b+\text{OldScore}(x)/\text{MaxOS}),$$

where MaxLS is the maximum of the LocalScore values and MaxOS is the maximum of the OldScore values for each document in the initial set of documents. The a and b values are constants, and, may be, for example, each equal to one.

Occasionally, a set of documents may have very little inter-connectivity. In this situation, MaxLS will be low. However, because of the lack of inter-connectivity, the contribution of LocalScore to the NewScore value should be reduced. Accordingly, re-ranking component 124 may set MaxLS to a higher value when MaxLS is below a preset threshold. Stated more formally, if MaxLS is less than MaxLSMin, then MaxLS is set to MaxLSMin, where MaxLSMin is a predetermined minimum value. The appropriate value for MaxLSMin is dependent on the nature of the ranking values generated by main ranking component 123 and can be determined by trial and error.

As described above, a document's relevance ranking, as determined by a conventional document ranking component, is refined based on the inter-connectivity between the document and other documents that were initially determined to be relevant to a user's search query. The new, modified rank value for the document may then be used by the search engine in ordering the list of relevant documents returned to the user.

In operation, search engine 120 may receive a search query from one of users 105. Document locator 121 generates an initial list of potentially relevant documents. These documents are ranked by main ranking component 123 based on relevance, and then assigned modified rank values by re-ranking component 124. Search engine 120 may then sort the final list of documents based on the modified rank values (i.e., on the NewScore values) and return the sorted list to the user. Ideally, the documents that the user is most interested in viewing will be the first ones returned by search engine 120.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed the operation of search engine 120 in the context of a search of documents on the world wide web, search engine 120 could be implemented on any corpus. Moreover, while series of acts have been presented with respect to FIGS. 2 and 3, the order of the acts may be different in other implementations consistent with the present invention.

The scope of the invention is defined by the claims and their equivalents.

What is claimed:

1. A method of generating documents based on a search query, comprising:

obtaining an initial set of documents relevant to the search query;

assigning relevance scores to the documents based on cross references between the documents within the initial set; and sorting the documents based on the assigned relevance scores.

2. The method of claim 1, wherein the initial set of documents are associated with initial relevance scores, and wherein assigning the relevance scores includes:

calculating a local score value for at least two of the documents in the initial set, the local score value quantifying an amount that the at least two documents are supported by other documents in the initial set of documents; and generating refined relevance scores for the at least two documents in the initial set based on the local score values and the initial relevance scores.

3. The method of claim 1, wherein the initial set of documents are associated with initial relevance scores, and wherein assigning the relevance scores includes:

calculating a local score value for at least two of the documents in the initial set based on the cross references to the at least two documents by other documents in the initial set of documents; and generating refined relevance scores for the at least two documents in the initial set based on the local score values and the initial relevance scores.

4. The method of claim 2, wherein calculating the local score value for a particular one of the at least two documents in the initial set of documents further includes:

forming a sub-set of documents from the initial set of documents as the sub-set of documents that cross reference the particular one of the at least two documents, and removing at least one document from the sub-set that is affiliated with the particular one of the at least two documents.

5. The method of claim 4, further comprising:

removing, for at least one pair of documents in the sub-set that are affiliated, one of the documents in the pair that has a lower initial relevance score than the other of the documents in the pair.

6. The method of claim 4, wherein a predefined number of the documents in the sub-set are used to calculate the local score value.

7. The method of claim 4, wherein the local score value is calculated for the particular one of the at least two documents as:

$$\sum_{i=1}^{k} \text{OldScore}(\text{BackSet}(i))^m$$

where OldScore(x) refers to the initial relevance score value for one of the at least two documents, BackSet refers to the sub-set of documents, the sum is taken over the first k documents in BackSet, where k is a predefined number, and m is a predetermined constant.

8. The method of claim 2, wherein generating the refined relevance scores is based on taking a product based on the local score values and the initial relevance scores.

9. The method of claim 2, wherein generating the refined relevance score further includes:

calculating the refined relevance scores as $$\text{NewScore}(x)=(a+\text{LocalScore}(x)/\text{MaxLS})(b+\text{OldScore}(x)/\text{MaxOS})$$

where NewScore is the calculated refined relevance score value, a and b are predetermined constants, MaxLS is equal to the maximum of the calculated local score values, MaxOS is equal to the maximum of the calculated initial relevance score values, and LocalScore(x) refers to the local score value.

10. The method of claim 9, further including:
setting MaxLS to a predetermined threshold value when MaxLS is below the threshold value.

11. The method of claim 1, wherein obtaining the initial set of relevant documents includes obtaining the initial set based on a matching of terms in the search query to a corpus.

12. A method of responding to a search query from a user, the method comprising:
receiving the search query from the user;
generating a list of relevant documents based on search terms of the query;
generating relevance scores for the documents in the list of relevant documents based on cross references between the documents in the list; and
returning a set of relevant documents to the user, the set being sorted based on the relevance scores.

13. The method of claim 12, wherein generating the list of relevant documents includes determining initial relevance scores for the list of relevant documents and wherein generating the relevance scores includes:
calculating a local score value for at least two of the documents in the list of relevant documents, the local score value quantifying an amount that the at least two documents are cross referenced by other documents in the list of relevant documents; and
calculating refined relevance scores for the documents in the initial set based on the local score values and the initial relevance scores.

14. The method of claim 13, wherein calculating the local score value for a particular one of the documents in the list of relevant documents further includes:
forming a sub-set of documents from the list of relevant documents as the sub-set of documents that cross reference the particular one of the documents, and
removing at least one document from the sub-set that is affiliated with the particular one of the documents.

15. The method of claim 14, further comprising:
removing, for at least one pair of documents in the sub-set that are affiliated, one of the documents in the pair that has a lower initial relevance score than the other of the documents in the pair.

16. The method of claim 14, wherein a predefined number of the documents in the sub-set are used to calculate the local score value.

17. The method of claim 13, wherein calculating the relevance scores is based on taking a product based on the local score values and the initial relevance scores.

18. A system for identifying documents relevant to a search query comprising:
means for obtaining an initial set of relevant documents from a corpus based on a matching of terms in the search query to the corpus;
means for assigning refined relevance scores to the set of relevant documents based on an amount that the documents of the initial set are cross referenced by other documents in the initial set of documents; and
means for sorting the documents in the initial set based on the refined relevance scores.

19. The system of claim 18, further comprising:
means for determining an initial relevance score for each document in the initial set of relevant documents.

20. The system of claim 18, wherein the means for assigning further includes:
means for forming a sub-set of documents from the initial set of relevant documents as the sub-set of documents that cross reference a particular one of the documents in the initial set of relevant documents, and
means for removing documents from the sub-set that are affiliated with the particular one of the documents in the initial set of relevant documents.

21. A computer-readable medium storing instructions for causing at least one processor to perform a method that identifies documents relevant to a search query, the method comprising:
obtaining an initial set of documents relevant to the search query;
assigning refined relevance scores to the documents based on cross references between the documents within the initial set; and
sorting the documents based on the refined relevance scores.

22. The computer-readable medium of claim 21, wherein the initial set of documents are associated with initial relevance scores, and wherein assigning the refined relevance scores includes:
calculating a local score value for at least two of the documents in the initial set, the local score value quantifying an amount that the at least two documents are cross referenced by other documents in the initial set of documents; and
generating the refined relevance scores for the documents in the initial set based on the local score values and the initial relevance scores.

23. The computer-readable medium of claim 21, wherein calculating the local score value for a particular one of the initial set of documents further includes:
forming a sub-set of documents from the initial set of documents as the sub-set of documents that contain a hyperlink to the particular one of the documents, and
removing documents from the sub-set that are from a same host or from an affiliated host as the particular one of the documents.

24. The computer-readable medium of claim 23, further comprising:
removing, for pairs of documents in the sub-set that are affiliated, one of the documents in the pair that has a lower refined relevance score than the other of the documents in the pair.

25. The computer-readable medium of claim 23, wherein a predefined number of the documents in the sub-set are used to calculate the local score value.

26. The computer-readable medium of claim 23, wherein obtaining the initial set of relevant documents includes obtaining the initial set based on a matching of terms in the search query to a corpus.

27. The method of claim 1, wherein the cross references are hyperlinks.

28. The method of claim 12, wherein the cross references are hyperlinks.

29. The system of claim 18, wherein the cross references are hyperlinks.

30. The computer-readable medium of claim 21, wherein the cross references are hyperlinks.

* * * * *